(12) United States Patent
Kristiansen et al.

(10) Patent No.: US 8,078,406 B2
(45) Date of Patent: Dec. 13, 2011

(54) PROCESSING SEISMIC DATA IN COMMON GROUP-CENTER GATHERS

(75) Inventors: Paal Kristiansen, Oslo (NO); Ralf G. Ferber, Horsham (GB); Lee West, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 289 days.

(21) Appl. No.: 12/428,500

(22) Filed: Apr. 23, 2009

(65) Prior Publication Data

US 2010/0057367 A1 Mar. 4, 2010

Related U.S. Application Data

(60) Provisional application No. 61/093,634, filed on Sep. 2, 2008.

(51) Int. Cl.
*G01V 1/28* (2006.01)
(52) U.S. Cl. .............. 702/14; 702/16; 702/17; 702/182; 367/73; 367/74
(58) Field of Classification Search .................... 702/14, 702/16, 17, 182; 367/73, 74
See application file for complete search history.

(56) References Cited

U.S. PATENT DOCUMENTS

| 5,073,876 A | 12/1991 | Propes |
| 6,188,964 B1 | 2/2001 | Reister et al. |
| 6,424,920 B1 | 7/2002 | Osypov |
| 7,088,639 B2 | 8/2006 | Walls et al. |
| 2004/0015296 A1* | 1/2004 | Causse et al. .................. 702/14 |

OTHER PUBLICATIONS

Adam, et al., A Fast Method for Accurately determining 3-D Refraction Static Corrections, CSEG Conference 2003.
Baeten, et al., Static Perturbation Corrections and Single Sensor Data, EAGE Expanded Abstracts, 2001.
Fomel, Applications of Plane-Wave Destruction Filters, Geophysics, Nov.-Dec. 2002, pp. 1946-1960, vol. 67, No. 6.
Lawton, Computation of Refraction Static Corrections using First-Break Traveltime Differences, Geophysics, Oct. 1989, pp. 1289-1296, vol. 54, No. 10.
PCT Search Report, dated Feb. 26, 2010, Application No. PCT/US2009/054408.

* cited by examiner

*Primary Examiner* — Sujoy Kundu

(57) ABSTRACT

A method for processing seismic data. The method includes plotting a travel-time curve and one or more actual times that each seismic receiver receives one or more seismograms on a graph. The travel-time curve represents an approximate time that each seismic receiver in a seismic survey area receives the seismograms. The method may further include determining a residual static shift for each seismogram and using the residual static shift to estimate a time shift correction. The residual static shift represents a difference between an actual time in which a seismic receiver received a seismogram and a time on the travel-time curve that corresponds to the actual time. The time shift correction corrects a timing error in the time indicated by the travel-time curve.

21 Claims, 12 Drawing Sheets

US 8,078,406 B2

PROCESSING SEISMIC DATA IN COMMON GROUP-CENTER GATHERS

RELATED APPLICATIONS

This application claims priority to U.S. provisional patent application Ser. No. 61/093,634, filed Sep. 2, 2008, titled PROCESSING SEISMIC DATA IN COMMON GROUP-CENTER GATHERS, which is incorporated herein by reference.

BACKGROUND

1. Field of the Invention

Implementations of various technologies described herein generally relate to seismic data processing, and more particularly, the seismic data in common group-center gathers.

2. Description of the Related Art

The following descriptions and examples are not admitted to be prior art by virtue of their inclusion within this section.

Seismic exploration is widely used to locate and/or survey subterranean geological formations for hydrocarbon deposits. Since many commercially valuable hydrocarbon deposits are located beneath areas of land and bodies of water, various types of marine seismic surveys have been developed.

In a typical land seismic survey, seismic receivers are installed in specific locations around the land in which hydrocarbon deposits may exist. Seismic sources, such as vibrators, may move across the land and produce acoustic signals, commonly referred to as "shots," directed down to the land, where they are reflected from the various subterranean geological formations. Reflected signals are received by the seismic receivers, digitized, and then transmitted to the survey database. The digitized signals are referred to as seismograms and are recorded on the survey database. The seismograms may then be used to represent subterranean geological formations beneath the land. Analysis of the representation may indicate probable locations of hydrocarbon deposits in the subterranean geological formations.

In a typical marine seismic survey, seismic streamers are towed behind a survey vessel. The seismic streamers may be several thousand meters long and contain a large number of seismic receivers, such as hydrophones, geophones, and associated electronic equipment, which are distributed along the length of the seismic streamer cable. The survey vessel may also include one or more seismic sources, such as air guns and the like. The seismic streamers may be in an over/under configuration, i.e., one set of streamers being suspended above another set of streamers. Two streamers in an over/under configuration, referred to as twin streamers, may be towed much deeper than streamers in a conventional single configuration.

As the seismic streamers are towed behind the survey vessel, acoustic signals, commonly referred to as "shots," produced by the one or more seismic sources are directed down through the water into strata beneath the water bottom, where they are reflected from the various subterranean geological formations. Reflected signals are received by the seismic receivers, digitized, and then transmitted to the survey vessel. The digitized signals are referred to as seismograms and are recorded and at least partially processed by a signal processing unit deployed on the survey vessel. The seismograms may be processed in the similar manner as the seismograms acquired from a land seismic survey.

SUMMARY

Described herein are implementations of various technologies for processing seismic data from seismic receivers within a close proximity of each other (in common group-center gathers).

In one implementation, a method for processing seismic data includes plotting a travel-time curve and one or more actual times that each seismic receiver receives one or more seismograms on a graph. The travel-time curve represents an approximate time that each seismic receiver in a seismic survey area receives the seismograms. The method may further include determining a residual static shift for each seismogram and using the residual static shift to estimate a time shift correction. The residual static shift represents a difference between an actual time in which a seismic receiver received a seismogram and a time on the travel-time curve that corresponds to the actual time. The time shift correction corrects a timing error in the time indicated by the travel-time curve.

In another implementation, a computer system may include a memory which may have program instructions executable by a processor to process seismic data. In order to process the seismic data, the computer system may plot a travel-time curve and one or more actual times that each seismic receiver receives one or more seismograms on a graph. The travel-time curve represents an approximate time that each seismic receiver in a seismic survey area receives the seismograms on the graph. The computer system may then perform a linear moveout (LMO) correction on the seismograms and stack the LMO corrected seismograms. The stacked LMO corrected seismograms may then be cross correlated with each LMO corrected seismogram to determine a residual static shift. The residual static shift is determined by calculating the peak amplitude from each cross correlation between the stacked LMO corrected seismograms and each LMO corrected seismogram. The computer system may then use the residual static shift to estimate a time shift correction to correct a timing error in the time indicated by the travel-time curve.

In yet another implementation, a computer-readable storage medium may have stored thereon computer-executable instructions which, when executed by a computer, cause the computer to process seismic data. In order to process the seismic data, the computer-readable storage medium may plot a travel-time curve and one or more actual times that each seismic receiver receives one or more seismograms on a graph. The travel-time curve represents an approximate time that each seismic receiver in a seismic survey area receives the seismograms on the graph. The computer-readable storage medium may then create a first mathematical vector having a ray parameter variable and one or more residual static shift variables. The residual static shift variables represent a difference between an actual time in which a seismic receiver received a seismogram and a time on the travel-time curve that corresponds to the actual time. The computer-readable storage medium may then build a matrix having one or more differential offsets and one or more Kronecker deltas. The differential offsets are based on spatial differences between one or more seismic sources, one or more seismic receivers, and a center of the seismic receivers. After building the matrix, the computer-readable storage medium may create a second mathematical vector having a residual static shift estimate for each seismic source location. Using the first mathematical vector, the second mathematical vector, and the matrix, the computer-readable medium may set a product of the first mathematical vector and the matrix equal to the second mathematical vector. The computer-readable medium may then solve for the residual static shift variables in the first mathematical vector. The solved residual static shift variables represents estimated a time shift corrections to correct one or more timing errors in the time indicated by the travel-time curve.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
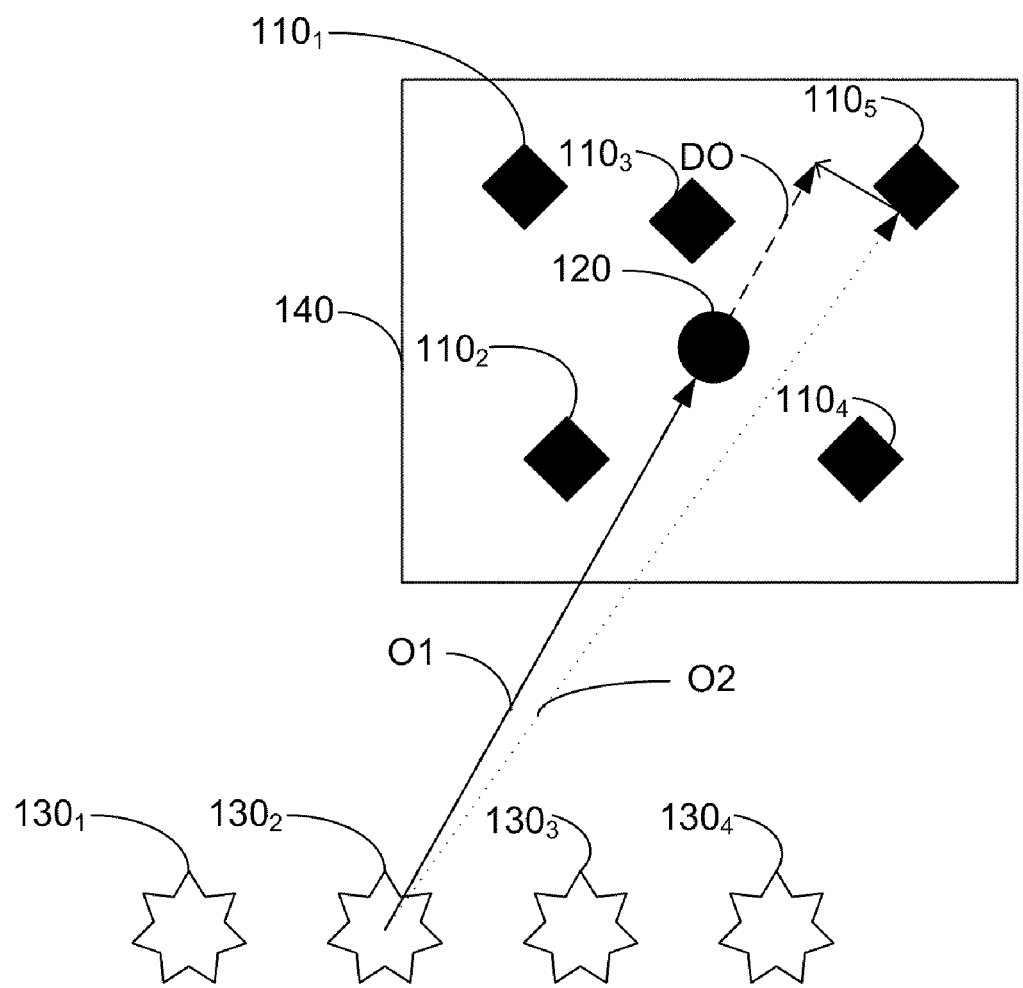
FIG. 1 illustrates a schematic diagram of a land seismic survey in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein. The following paragraphs provide a brief description of one or more implementations of various technologies and techniques directed at determining the residual static shifts for each seismogram in the common group-center gathers.

Common group-center (CGC) gathers may be defined as a collection of one or more seismograms recorded by one or more seismic receivers in a close proximity to one or more seismic sources. The group-center may be located anywhere within the range of seismic receiver locations. In one implementation, the group-center may coincide with an actual seismic receiver location. Each seismogram of a common group-center gather may be assigned a differential offset, which is the difference between the distance between the seismic source location and a seismic receiver location and the distance between the seismic source and group-center location. In one implementation, common group-center gathers may also be defined for a range of seismic sources instead of a range of seismic receivers. Furthermore, each seismogram may include a residual static shift that represents the time difference between an expected travel-time curve and the actual time that a seismic wave was received by the corresponding receiver. The residual static shift represents a timing error between when the seismic wave was actually received by the receiver and when the seismic wave was expected to be received according to the expected travel. Such timing errors may represent depth errors for the location of oil or gas reservoirs which may have been estimated from the seismic data.

Jointly Estimating Residual Static Shift

In one implementation, in order to determine a residual static shift of each seismogram in each CGC gather, each seismogram may first be linear moveout (LMO) corrected. Each of the LMO corrected seismograms in a CGC gather may then be stacked together in order to generate a pilot stack. The pilot stack and the LMO corrected seismograms may now be used to determine the residual static shifts of each individual seismogram.

Next, each LMO corrected seismogram of each CGC gather may be cross-correlated with the pilot stack to determine the relative time-shift between each individual seismogram and the pilot stack. The cross-correlation of each LMO corrected seismogram against the pilot stack may result in a peak amplitude that corresponds to a relative time-shift. In one implementation, the relative time-shifts determined after cross-correlating each LMO corrected seismogram with the pilot stack may be defined as a vector, $\vec{b}'$, such that:

$$\vec{b}'=(\Delta t_{1,1}, \Delta t_{2,1}, \ldots, \Delta t_{N,1}, \ldots, \Delta t_{N,M})$$

which may be a vector of dimension N*M.

After determining the relative time-shifts, a vector of "unknowns," $\vec{a}'$, may be defined to be:

$$\vec{a}'=(p, s_1, s_2, \ldots, s_N)$$

where p is the ray parameter at the group center and $s_1$, $s_2, \ldots s_N$ are the residual static shifts. The ray parameter is the spatial differential of the traveltime and represents the local dip of the traveltime curve as a function of offset.

Next, a differential offset DO between the group center and each seismic receiver location in the CGC gather may be determined by subtracting an offset between the contributing seismic source location and the corresponding seismic receiver location and an offset between the same seismic source location and the group center. For each seismic source location and each seismic receiver location, the differential offsets between the seismic source location and the group-center location and between the seismic source location and the seismic receiver locations may be defined as:

$$\Delta x_{i,j}, 1 \leq i \leq N, 1 \leq j \leq M$$

where i denotes the receiver index and j the seismic source index, and where N is the number of seismic receivers in the CGC gather and M is the number of seismic source locations in the CGC gather.

In one implementation, a matrix X may be built using the differential offsets determined above such that the matrix X may be defined as:

$$(\Delta x_{i,j}, \delta_{i,1}, \delta_{i,2}, \ldots, \delta_{i,N})$$

where $\delta$ is a Kronecker delta.

Next, a linear system may be created to link the "unknowns", i.e., the ray parameter and residual static shifts to the "knowns", i.e., the relative time-shift vector, as follows:

$$X\vec{a} = \vec{b}$$

In one implementation, the results of the linear system may represent the residual static shifts of the seismograms in the CGC gather.

Sequentially Estimating Residual Static Shift

In another implementation, the residual static shift may again be estimated by solving the linear system $X\vec{a} = \vec{b}$. Again, a vector of "unknowns," $\vec{a}'$, may be defined to be:

$$\vec{a}' = (p, s_1, s_2, \ldots, s_N)$$

where p is the ray parameter at the group center and $s_1$, $s_2$, ... $s_N$ are the residual static shifts. In this implementation, however, the ray parameter may be estimated for each seismic source location of the CGC gather using a plane wave destruction filter technique, an interferometric ray parameter technique, or the like.

Next, the linear system may be created to link the "unknowns", i.e., residual static shifts, to the "knowns", i.e., the relative time-shift vector, as follows:

$$X\vec{a} = \vec{b}$$

Estimating Residual Static Shift via Stacking

In yet another implementation, the residual static shift may be estimated using a stacking process. Here, the ray parameter for each seismic source location of the CGC gather may be estimated using a plane wave destruction filter technique, an interferometric ray parameter technique, or the like.

Using the estimated ray parameter, LMO corrections may be performed on the CGC gathers.

Next, the LMO corrected seismograms may be stacked according to its respective seismic receiver. As such, each seismogram received by a particular seismic receiver of the CGC gather due to a first seismic shot is summed to the seismogram received at the same seismic receiver of the CGC gather due to a second seismic shot, and so forth. This gives a stacked seismogram that can be attributed to the location of the seismic receiver which may result in as many stacked seismograms as there are seismic receivers per CGC gather.

The stacking process creates stacked seismograms with almost identical wavelets but with time shifts between these seismograms equivalent to the residual static shift. Each LMO corrected stacked seismogram may be cross-correlated with the pilot stack to determine the residual static shift for each received seismogram.

One or more implementations of various techniques for processing seismic data in common group-center gathers will now be described in more detail with reference to FIGS. 1-10 in the following paragraphs.

FIG. 1 illustrates a schematic diagram of a land seismic survey 100 in accordance with implementations of various techniques described herein. In one implementation, the land seismic survey 100 may include one or more seismic source locations 130, where seismic devices such as a vibrator may emit seismic energy on the land. Each seismic source location 130 may be described as an X-Y coordinate pair along with an elevation level. Although only four seismic source locations 130 are illustrated in FIG. 1, it should be understood that any number of seismic source locations 130 may be used in implementations of various techniques described herein.

The land seismic survey 100 may also include one or more seismic receivers 110 and a group center 120. The seismic receivers 110 may be referred to as receivers or common group-center (CGC) receivers. In one implementation, a group of seismic receivers 110 may correspond to one gather 140, or one common group-center (CGC) gather 140. A gather 140 may be defined as a group of seismic receivers 110 within a predetermined distance from a center location, which may be referred to as a group center 120. The gather 140 may indicate a rectangular area encompassing one or more seismic receivers 110. However, it should be understood that the gather 140 may not be limited to rectangular shapes. For instance, the gather 140 may encompass other shapes such as a circle, triangle, and the like. The seismic receivers 110 may be permanently disposed in a certain location and may record seismic waves and other seismic activities that may have been created at the seismic source locations 130.

The seismic source locations 130 may be arranged in a straight line equidistant from each other. The seismic source device may travel along the straight line and emit seismic energy (seismic shot) at the seismic source locations 130. In one implementation, the seismic receivers 110 may be located along a line that may be perpendicular to the line in which the seismic source locations 130 may lie.

As mentioned above, the center location of the gather 140 may be a group center 120. In one implementation, the group center 120 may be defined by an experienced user. The experienced user may define the group center 120 location as a location on a regular grid or as a location of a particular seismic receiver 110. In another implementation, the group center 120 location may be determined with an algorithm that may define the locations of one or more group centers 120 based on its distance between other group centers 120. In yet another implementation, the group center 120 may be defined as the center of gravity with respect to the seismic receivers 110 located within the gather 140. In still another implementation, the group center 120 may be defined as the seismic receiver 110 that may be closest to the center of gravity of the gather 140. In some circumstances, the group center 120 may also coincide with a seismic receiver 110.

The land seismic survey 100 may be defined to exist in a spatial coordinate system such that the offset (distance) between a seismic source location 130 and the group center 120 (offset O1) and the distance between a seismic source location 130 and the seismic receiver 110 (offset O2) may be defined. In one implementation, the difference between the offset O1 and the offset O2 may be defined as a differential offset DO. The differential offset DO may be obtained using vector analysis such that the offset O2 may be rotated to the offset O1, and then a vector (differential offset DO) may added to indicate the difference between offset O2 and offset O1. In one implementation, if the differential offset DO is pointed away from the seismic source location 130, it may be deemed to be a positive offset; while a differential offset DO pointing towards the seismic source location 130 may be deemed to be a negative offset. The differential offset DO may be used to define the spatial coordinates of the gather 140 for signal processing.

Figure 2:
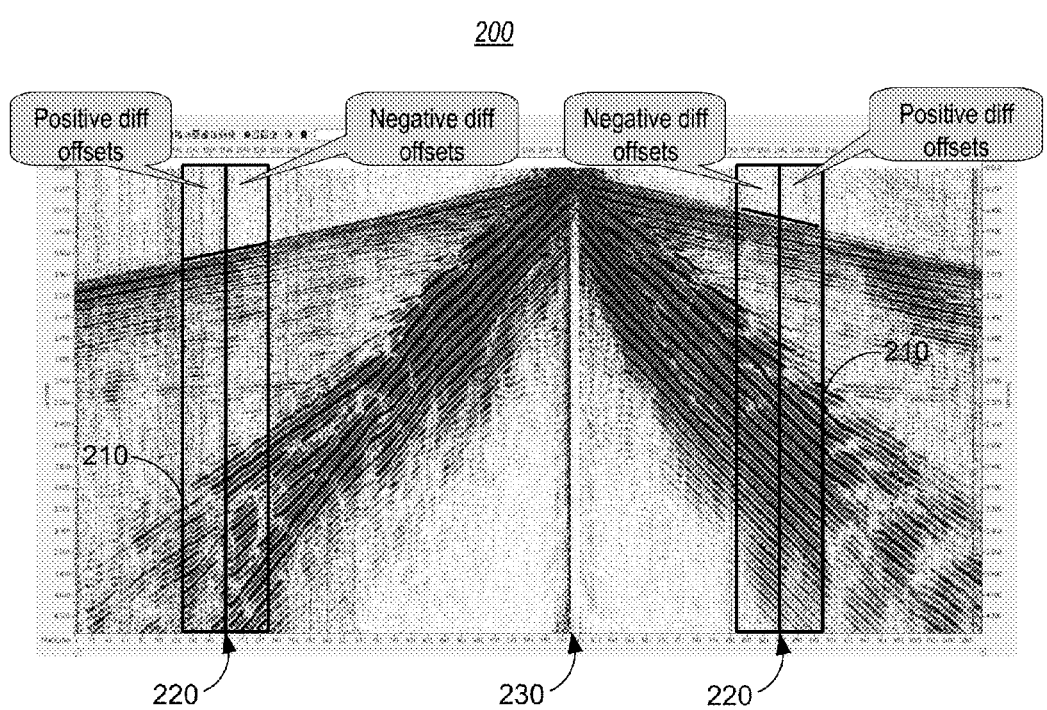
FIG. 2 illustrates a diagram describing the travel times of seismic waves from a seismic source to several seismic receivers in accordance with implementations of various techniques described herein.

FIG. 2 illustrates a diagram describing the travel-time curves 200 of seismic waves from a seismic source to several seismic receivers in accordance with implementations of various techniques described herein. The following description of the travel-time curves 200 is made with reference to the land seismic survey 100 of FIG. 1. In one implementation, the travel-time curves 200 of the seismic waves may be shown as a linear curve as a function of the differential offset.

The travel-time curves 200 may be partitioned into one or more windows 210. Each window 210 may contain a travel-time curve describing the time in which the seismic wave travels from the seismic source location 130 to the seismic receivers 110 within a gather 140. The line dividing each window 210 in half may indicate the group center 220. The group center 220 may correspond to the group center 120 of FIG. 1. The half of the time curve in each window 210 that decreases in time as the line moves further away from the group center 220 may denote negative differential offsets. Conversely, the half of the time curve in each window 210 that increases in time as the line moves further away from the group center 220 may denote positive differential offsets. The seismic source 230 may indicate the origin of the seismic wave from a seismic device, such as a vibrator.

Figure 3:
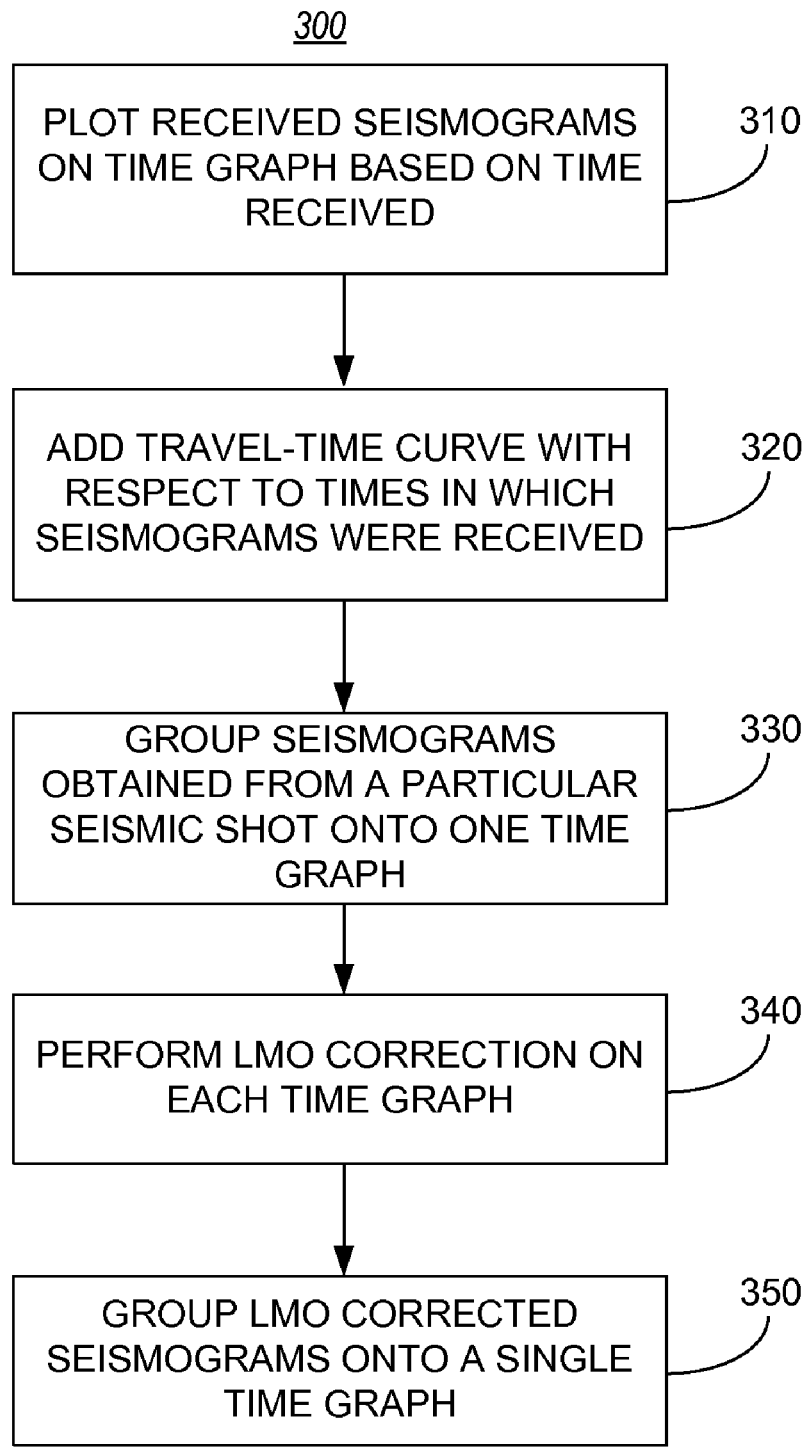
FIG. 3 illustrates a flow diagram of a method for creating a pilot stack of linear moveout (LMO) corrected seismograms in accordance with implementations of various technologies described herein.

FIG. 3 illustrates a flow diagram of a method 300 for creating a pilot stack of linear moveout (LMO) corrected seismograms in accordance with implementations of various technologies described herein. The following description of method 300 for creating a stack of LMO corrected seismograms is made with reference to the land seismic survey 100 of FIG. 1 and the time graphs in FIGS. 4-7.

Figure 4:
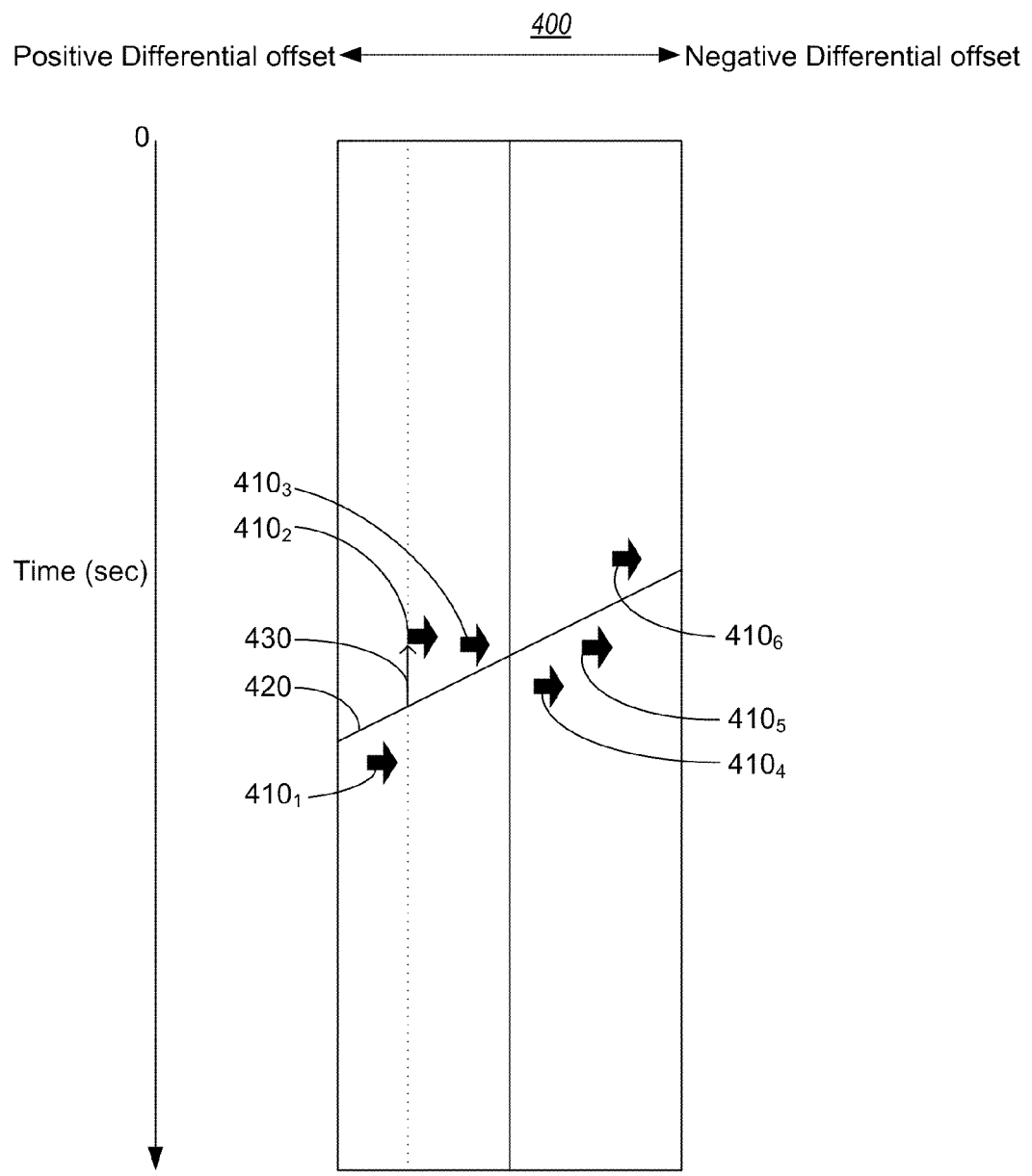
FIG. 4 illustrates a diagram of a common group center gather's refraction travel-time curve with actual travel times in accordance with various implementations described herein.

At step 310, each seismogram received by each seismic receiver 110 may be plotted on a time graph as illustrated in FIG. 4. FIG. 4 illustrates a time graph that may describe the actual times in which each seismogram 410 was received by the seismic receiver 110 in accordance with various implementations described herein. Each seismogram 410 may be represented on the time graph 400 with a black arrow. In one implementation, the time graph 400 may correspond to one of the windows 210 illustrated in FIG. 2. Therefore, the seismograms 410 received by a seismic receiver 110 may be plotted on the time graph 400 according to the time in which it was received by the seismic receiver 110. In one implementation, each seismogram 410 represented in the time graph 400 may correspond to a seismic shot created by a seismic source at various seismic locations 130 as it was received by a single seismic receiver (e.g., receiver $110_1$).

At step 320, a travel-time curve 420 may be added to the time graph 400 as illustrated in FIG. 4. The travel-time curve 420 may be created with respect to the actual times in which the seismogram 410 was received by the seismic receiver 110. In one implementation, the travel-time curve 420 may represent a best fit curve given the actual times in which each seismogram 410 was received by the seismic receiver 110. The difference between the actual time in which the seismogram 410 was received and the travel-time curve 420 is indicated by the residual static shift 430.

Figure 5:
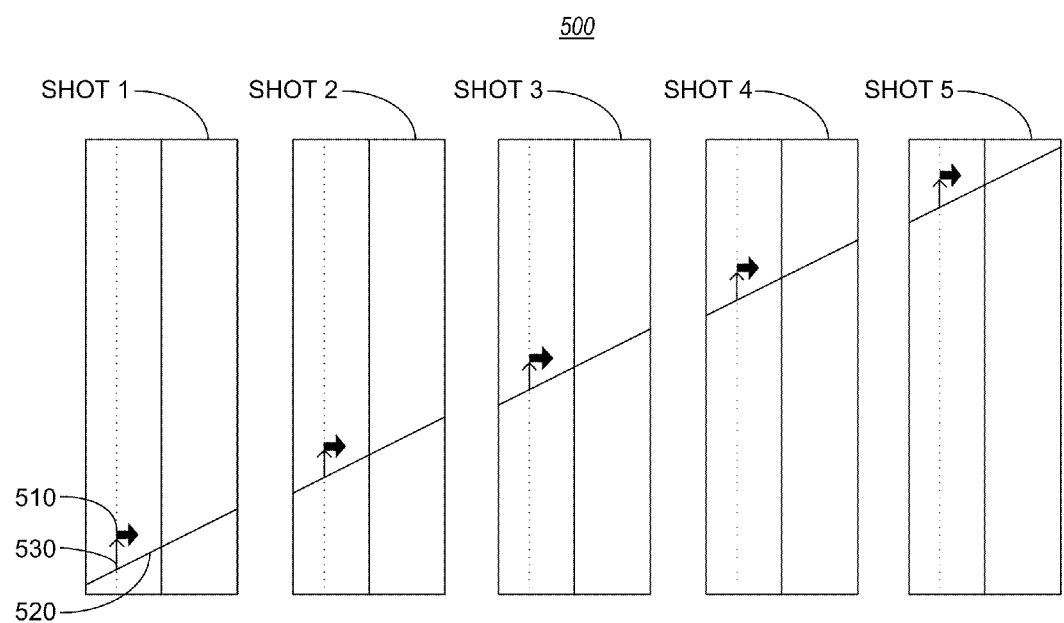
FIG. 5 illustrates diagrams describing refraction travel times for five shots for an individual seismic receiver within a common group center gather in accordance with implementations of various technologies described herein.

At step 330, the seismograms 410 for each seismic shot may be grouped into separate time graphs. In one implementation, the seismograms 410 that were received from a particular seismic shot may be illustrated on a single time graph as indicated in FIG. 5. FIG. 5 illustrates a plurality of time graphs 500 such that each seismogram 410 that was created due to each seismic shot is represented on a single time graph 500. In one implementation, a mobile seismic source device may produce seismic shots at each seismic source location 130, while the seismic receivers 110 and the group center 120 remain stationary. As such, the time graph 500 for Shot 1 in FIG. 5 may represent the seismic shot that was created furthest away from the seismic receiver 110, and shot 5 may represent the seismic shot created closest to the seismic receiver 110 because the travel time of the seismograms are shorter for Shot 5 than for Shot 1. Although each time graph 500 only includes one seismogram 510, it should be understood that each time graph may include all of the seismograms 510 received from each seismic receiver 110 on a single time graph 500. FIG. 5 includes only one seismogram 510 in each time graph 500 in order to illustrate the effect to the residual static shift 530 of the seismograms 510 as the seismic shots move closer and further away from a particular seismic receiver 110.

Referring to FIG. 3 and FIG. 5, at step 330, a travel-time curve 520 may also be added to each time graph 500 to indicate the best fit curve given the actual times in which each seismogram 510 was received as described in step 320. The difference between the actual time in which the seismogram 510 was received and the travel-time curve 520 may be represented in the time graphs 500 as the residual static shift 530. An analysis of the time graphs 500 may indicate that the residual static shift 530 remains constant for each seismogram 510 received by the same seismic receiver 110 for each seismic shot. Therefore, a basic assumption may be made that the residual static shift 530 is surface consistent such that it relates to the location of the seismic receiver 110 and is not dependent on the location of the seismic source location 130.

Figure 6:
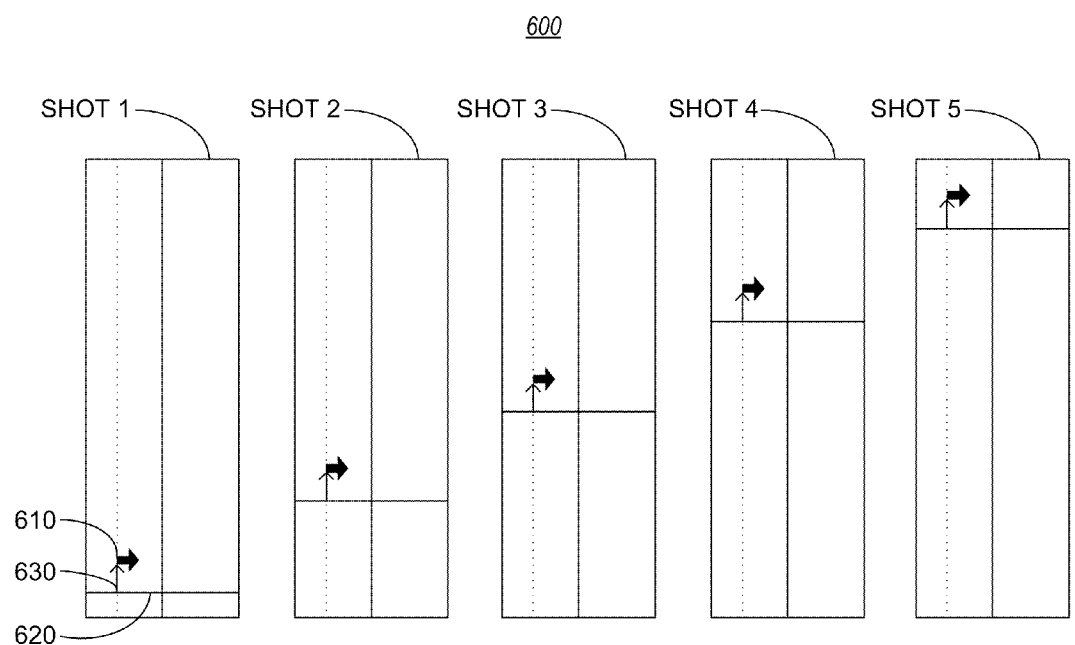
FIG. 6 illustrates diagrams describing refraction travel times for five shots for an individual seismic receiver within a common group center gather after linear moveout (LMO) corrections in accordance with implementations of various technologies described herein.

At step 340, travel-time curve 520 and the actual time in which the seismogram 510 was received may be linear moveout (LMO) corrected using an LMO velocity analysis. FIG. 6 illustrates linear moveout (LMO) corrected travel-time curves and the actual times in which the seismogram was received in the time graphs 500 for the individual shots described in FIG. 5.

Figure 7:
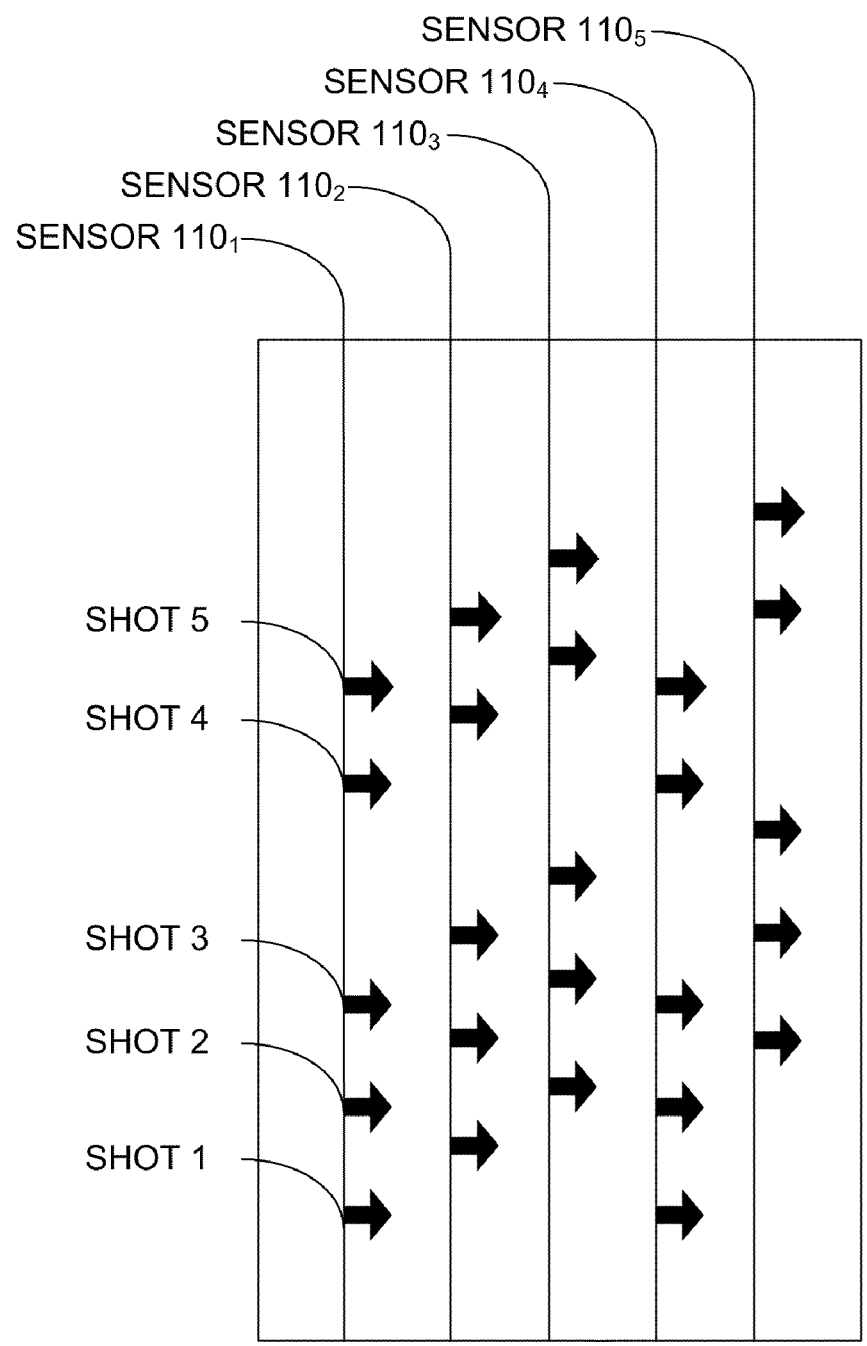
FIG. 7 illustrates a diagram describing stacks of LMO corrected seismograms for five seismic receiver locations in accordance with implementations of various technologies described herein.

Also at step 340, an LMO velocity analysis may be performed on each time graph 500 as indicated in FIG. 5 to estimate a ray parameter (or local time dip) of the travel-time curve 520. In one implementation, the ray parameter may be used to convert the refraction travel-time curve 520 to a corrected refraction travel-time curve 620 as indicated in FIG. 6. The actual time in which the seismogram 610 was received and the residual static shift 630 correspond to the actual time in which the seismogram 510 was received and the residual static shift 530. The actual time in which each seismogram 610 was received may still have the same residual static shift 630 away from the corrected refraction travel-time curve 620 as indicated before the LMO correction. At step 350, the LMO corrected seismograms 610 received at each seismic receiver 110 may be summed together or stacked onto a single time graph as illustrated in FIG. 7. FIG. 7 illustrates a diagram with stacks of LMO corrected seismograms 610 for the five seismic receivers 110.

Also at step 350, each LMO corrected seismogram 610 for each shot received by each seismic receiver 110 may be consolidated onto a single axis on the time graph 700 as illustrated in FIG. 7. In one implementation, the LMO corrected seismograms may be stacked according to its respective seismic receiver 110. As such, each seismogram received by a particular seismic receiver of the gather 140 due to a first seismic shot is summed to the seismogram received at the same seismic receiver of the gather 140 due to a second seismic shot, and so forth. This gives a stacked seismogram that can be attributed to the location of the seismic receiver 110 which may result in as many stacked seismograms as there are seismic receivers 110 per CGC gather.

For example, the LMO corrected seismograms 610 for shots 1-5 that were received by the seismic receiver 110₁ may be stacked on a single Y-axis (e.g., seismic receiver 110₁) reference line to indicate the travel-time characteristics of each seismogram 610 for the seismic receiver 110₁. Similarly, the LMO corrected seismograms for shots 1-5 received by the seismic receiver 110₂, seismic receiver 110₃, seismic receiver 110₄, and seismic receiver 110₅ may each be stacked on a corresponding Y-axis reference line as indicated in FIG. 7. In one implementation, the stacks of LMO corrected seismograms may be referred to as a pilot stack.

In one implementation, the seismogram 610 recorded with a selected seismic receiver 110 in the gather 140 of a first shot may be added to the seismogram recorded at the same seismic receiver of a second, third, etc. shot. The summation of these seismogram recordings creates a stacked seismogram that may include as many stacked seismograms as there may be seismic receivers 110 in the gather 140. The stacking process may create stacked seismograms with almost identical wavelets but with a time shift between these seismograms equal to the residual static shift.

Figure 8:
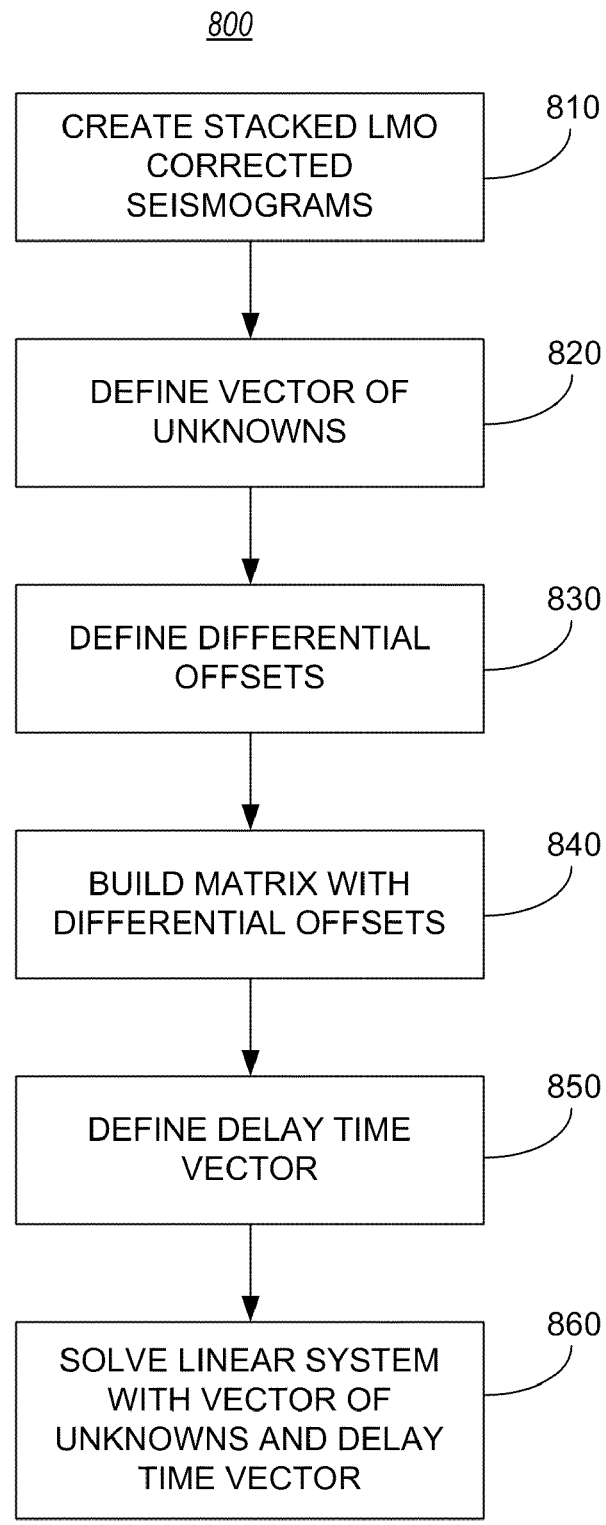
FIG. 8 illustrates a flow diagram of a method for jointly estimating a ray parameter and a residual static shift in accordance with one or more implementations of various techniques described herein.

FIG. 8 illustrates a flow diagram of a method 800 for jointly estimating a ray parameter and a residual static shift in accordance with one or more implementations of various techniques described herein. The following description of method 800 is made with reference to the land seismic survey 100 of FIG. 1 and the stacks of LMO corrected seismograms 700 of FIG. 7. Additionally, it should be understood that while the operational flow diagram indicates a particular order of execution of the operations, in some implementations, certain portions of the operations might be executed in a different order.

At step 810, the stacks of LMO corrected seismograms may be generated as described in step 350 of FIG. 3.

At step 820, a vector of "unknowns," $\vec{a}'$, may be defined to be:

$$\vec{a}' = (p, s_1, s_2, \ldots, s_N)$$

where p is the ray parameter at the group center 120 and $s_1, s_2, \ldots s_N$ are the residual static shifts. In one implementation, the ray parameter p is estimated from the local time dip as indicated in the LMO corrected diagram.

At step 830, a differential offset DO may be determined based on the differences in the locations of the seismic source locations 130, the seismic receiver locations 110, and the group center 120 as described in FIG. 1. For example, the differential offset DO between the group center 120 and the seismic receiver location 110₅ may be determined by subtracting the offset O2 between the seismic source location 130₂ and the seismic receiver 110₅ and the offset O1 between the seismic source location 130₂ and the group center 120. For each seismic source location 130 and each seismic receiver location 110, the differential offsets between the seismic source location and the group-center location and the seismic receiver locations may be defined as:

$$\Delta x_{i,j}, 1 \leq i \leq N, 1 \leq j \leq M$$

where i denotes the receiver index and j the seismic source index.

At step 840, a matrix X may be built using the differential offsets determined at step 830. In one implementation, the matrix X may be defined as:

$$(\Delta x_{i,j}, \delta_{i,1}, \delta_{i,2}, \ldots, \delta_{i,N})$$

where $\delta$ is a Kronecker delta. The Kronecker delta may be defined as a vector containing zero values except for the n-th component which is unity. For example, the Kronecker delta for the vector $\delta_{i,j}$ has unity at the j-th component. The dimension of the rows of this matrix is N+1, where N is the number of seismic receivers, while the overall number of row-vectors (i.e., the column size) is N*M, where M is the number of seismic source locations. Hence, the matrix is of dimension (N*M)*(N+1).

At step 850 a delay time vector may be defined as:

$$\vec{b}' = (\Delta t_{1,1}, \Delta t_{2,1}, \ldots, \Delta t_{N,1}, \ldots, \Delta t_{N,M})$$

which may be a vector of dimension N*M. In one implementation, the individual seismograms for each common shot of the gather 140 after LMO corrections may be cross-correlated with the pilot stack to determine the relative time shifts for each seismic source at its corresponding seismic source location 130. The cross-correlation against the pilot stack may result in a peak amplitude which may correspond to a relative time shift. In such cross-correlation techniques, two seismograms are being cross-correlated to produce a cross-correlogram containing correlation coefficients as a function of relative time shift. In such cross-correlograms, the maximum correlation coefficient occurs at a relative time-shift equal to the time-shift between the two seismograms. In one implementation, the relative time-shift may include a range of residual static shift estimates for each seismic source at its corresponding seismic source location 130.

At step 860, a linear system may be created to link the "unknowns", i.e., the ray parameter and residual static shifts, to the "knowns", i.e., the delay time vector, as follows:

$$X\vec{a} = \vec{b}$$

In one implementation, the linear system may be solved using a least-squares method, such as:

$$\vec{a} = (X^tX + \epsilon)^{-1}X^t\vec{b}$$

Although the linear system has been described as being solved with the least-squares method, it should be understood that alternative techniques may also be used to solve the linear system.

Figure 9:
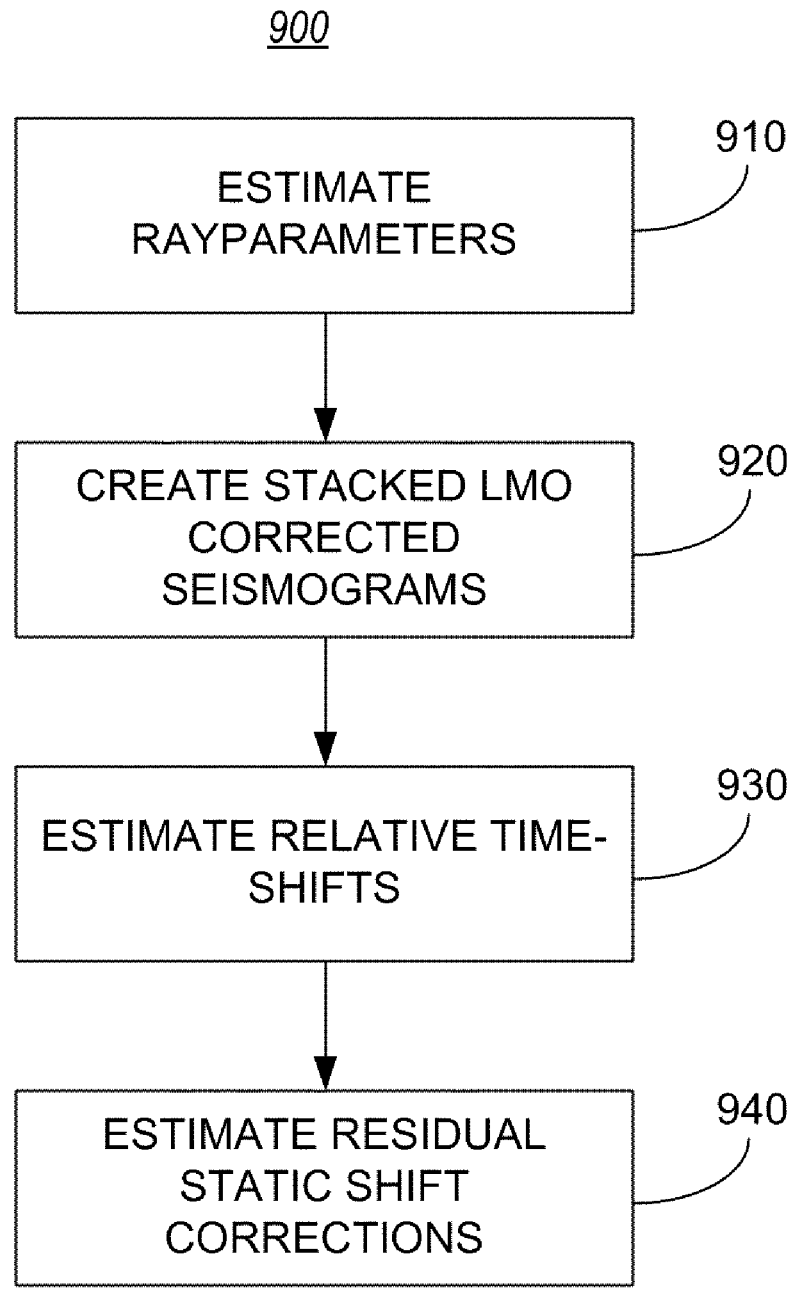
FIG. 9 illustrates a flow diagram of a method for sequentially estimating a ray parameter and a residual static shift in accordance with one or more implementations of various techniques described herein.

FIG. 9 illustrates a flow diagram of a method 900 for sequentially estimating a ray parameter and a residual static shift in accordance with one or more implementations of various techniques described herein. The following description of the method 900 is made with reference to the land seismic survey 100 of FIG. 1, the method 300 of FIG. 3, the method 800 of FIG. 8, and the stacks of LMO corrected seismograms 700 of FIG. 7. Additionally, it should be understood that while the operational flow diagram indicates a particular order of execution of the operations, in some implementations, certain portions of the operations might be executed in a different order.

At step 910, the ray parameter may be estimated for each seismic source location 130 of the gather 140 using a plane wave destruction filter technique. Although the ray parameter has been described to have been estimated using a plane wave destruction filter, it should be noted that in other implementations the ray parameter may be estimated using other techniques such as the interferometric ray parameter technique and the like.

At step 920, the stacks of LMO corrected seismograms may be generated as described in step 350 of FIG. 3. In one implementation, the resulting ray parameter determined at step 910 may be used to perform the LMO correction of the seismograms of the CGC gather.

At step 930, a delay time vector may be defined as:

$$\vec{b}' = (\Delta t_{1,1}, \Delta t_{2,1}, \ldots, \Delta t_{N,1}, \ldots, \Delta t_{N,M})$$

which may be a vector of dimension N*M. In one implementation the delay time vector may be defined according to the method described at step 850.

At step 940, the residual static shifts may be estimated by solving the linear system described in step 860 of FIG. 8 using the delay time vector defined at step 930 above.

Figure 10:
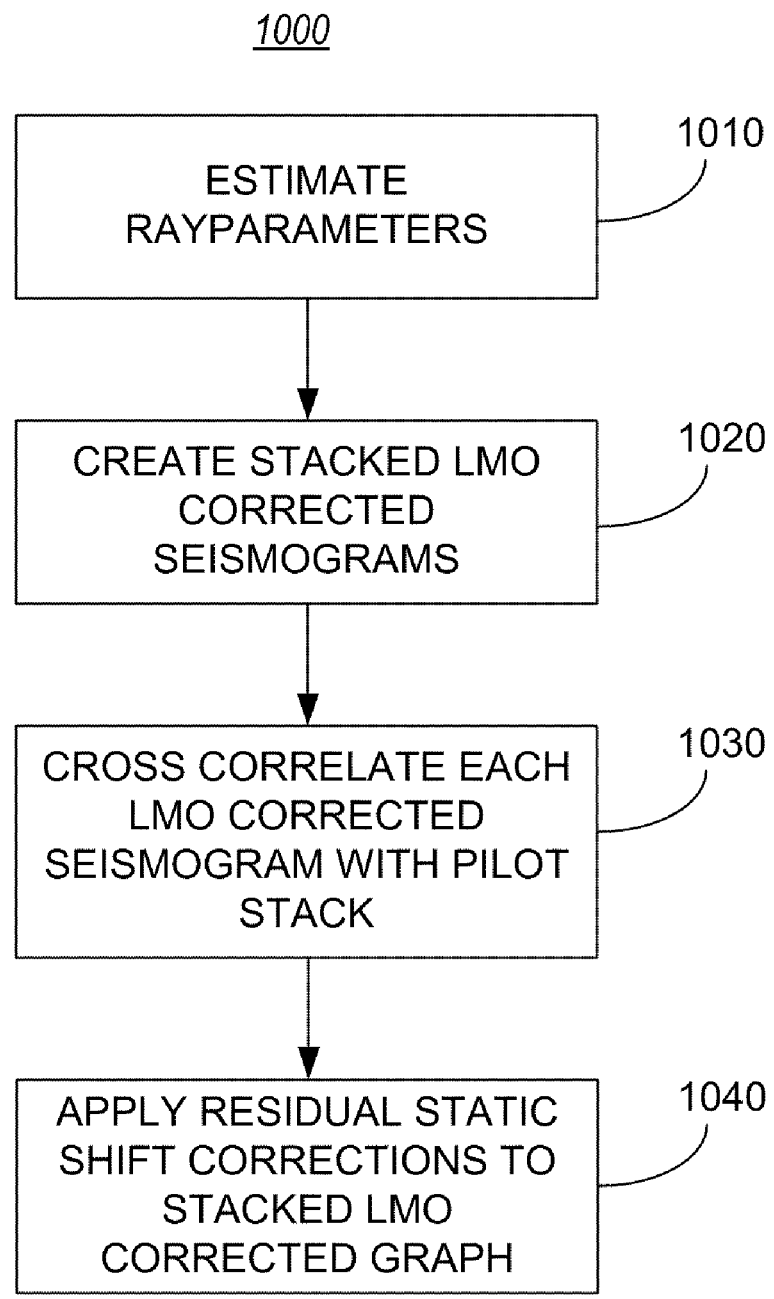
FIG. 10 illustrates a flow diagram of a method for estimating a ray parameter and a residual static shift via a stacking process in accordance with one or more implementations of various techniques described herein.

FIG. 10 illustrates a flow diagram of a method for estimating a ray parameter and a residual static shift via a stacking process in accordance with one or more implementations of various techniques described herein. The following description of method 1000 is made with reference to the land seismic survey 100 of FIG. 1, method 300 of FIG. 3, the stacks of LMO corrected seismograms 700 of FIG. 7, method 900 of FIG. 9, and the residual static shift corrected seismograms 100 of FIG. 11. Additionally, it should be understood that while the operational flow diagram indicates a particular order of execution of the operations, in some implementations, certain portions of the operations might be executed in a different order.

At step 1010, the ray parameter may be estimated for each seismic source location 130 of the gather 140 using a plane wave destruction filter technique as described in step 910 of FIG. 9.

At step 1020, the stacks of LMO corrected seismograms may be generated as described in step 920 of FIG. 9 using the ray parameter defined at step 1010 above. The stacking process may create stacked seismograms with almost identical wavelets but with time shifts between these seismograms equal to the residual static shift. At step 1030, each LMO corrected seismogram may be cross correlated with the stacks of LMO corrected seismograms (pilot stack) to determine the residual static shift for each received seismogram.

Figure 11:
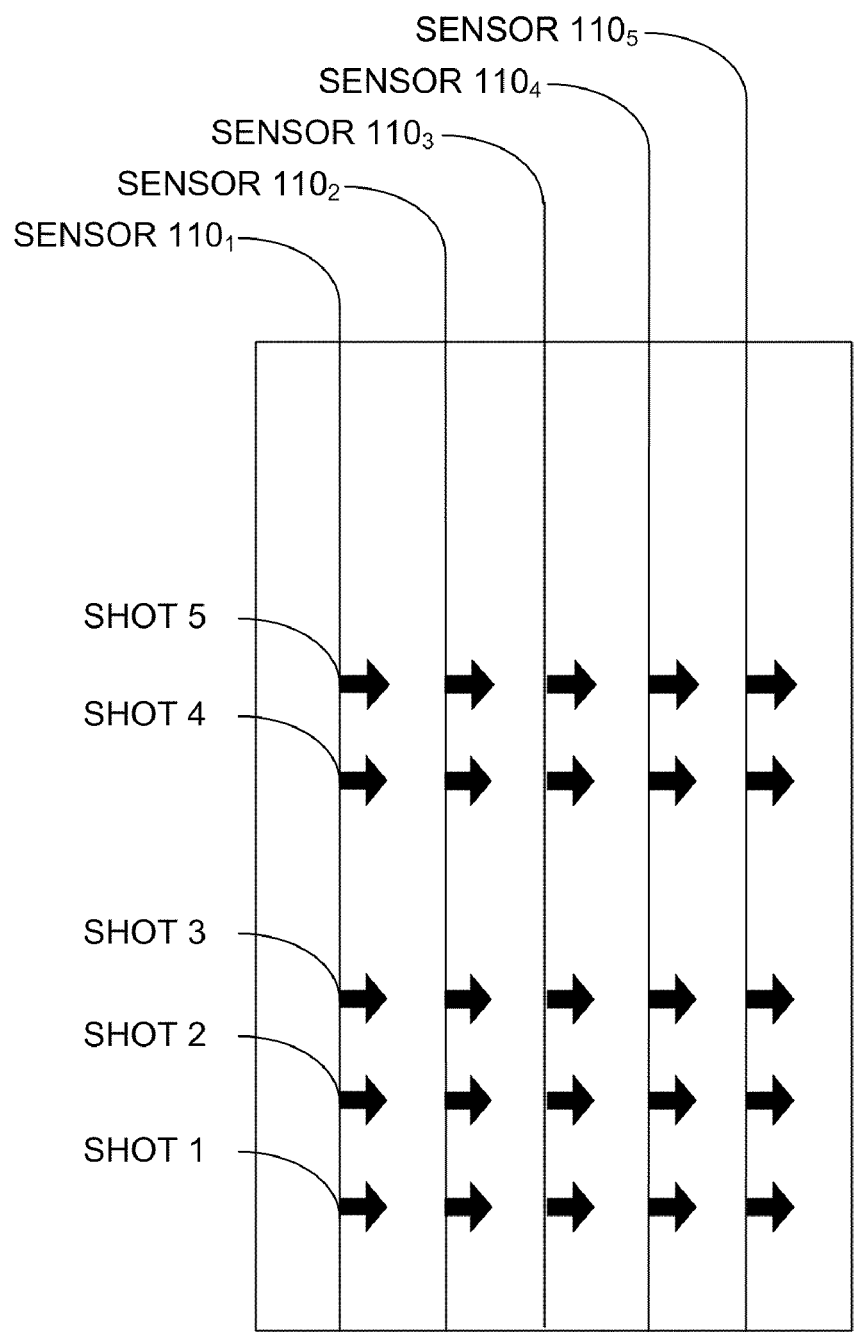
FIG. 11 illustrates a diagram describing residual static shift corrected seismograms for five seismic receiver locations in accordance with implementations of various technologies described herein.

At step 1040, the residual static shift determined at step 1030 for each seismogram may be applied to the LMO corrected stacked seismograms (FIG. 7) generated at step 1020 which may result in FIG. 11. In one implementation, FIG. 11 may be used for quality assurance purposes in determining if the determined residual static shift for each seismogram was correct.

Figure 12:
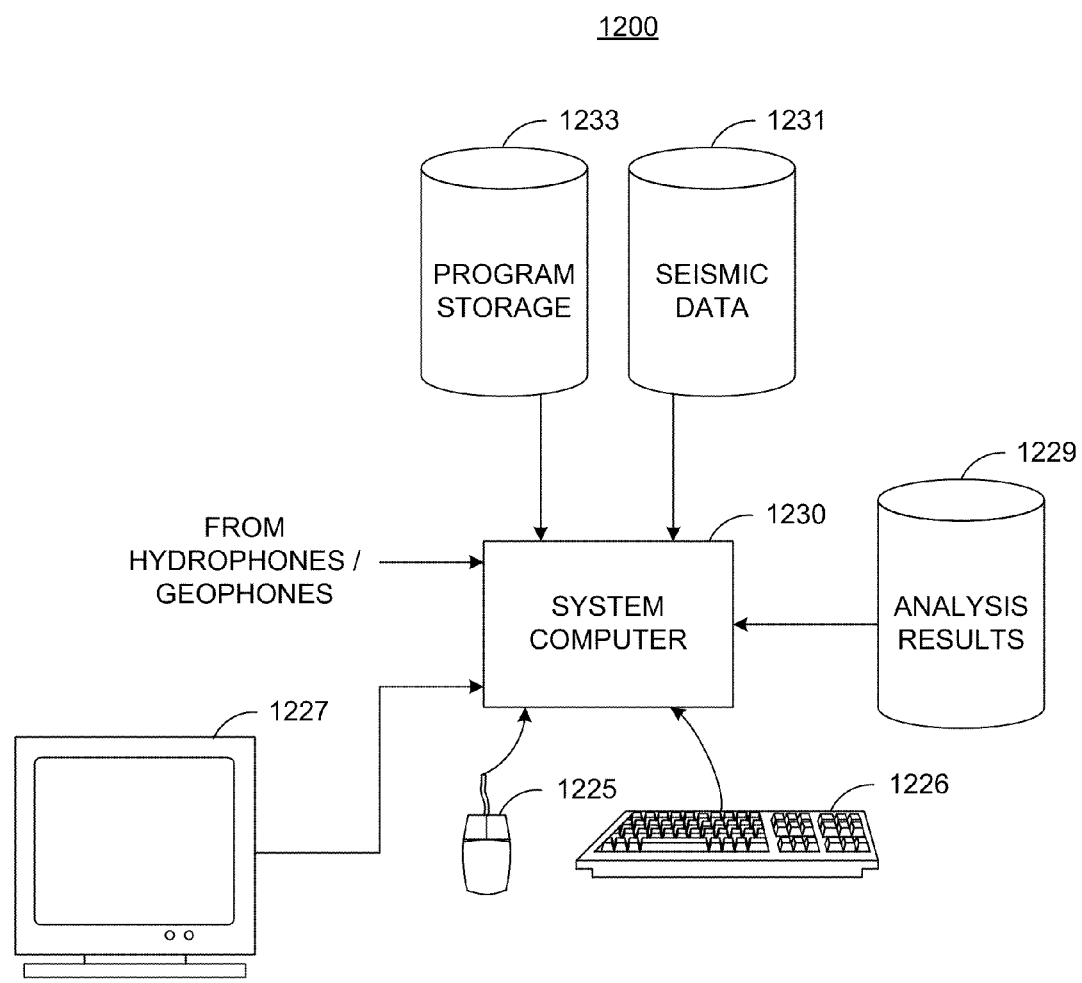
FIG. 12 illustrates a computer network into which implementations of various technologies described herein may be implemented.

FIG. 12 illustrates a computer network 1200 into which implementations of various technologies described herein may be implemented. In one implementation, the method for creating a pilot stack of linear moveout (LMO) corrected seismograms as described in FIGS. 3, the method for jointly estimating a ray parameter and a residual static shift as described in FIG. 8, the method for sequentially estimating a ray parameter and a residual static shift as described in FIG. 9, and the method for estimating a ray parameter and a residual static shift via a stacking process as described in FIG. 10 may be performed on the computer network 1200. The computer network 1200 may include a system computer 1230, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 1230 may be in communication with disk storage devices 1229, 1231, and 1233, which may be external hard disk storage devices. It is contemplated that disk storage devices 1229, 1231, and 1233 are conventional hard disk drives, and as such, will be implemented by way of a local area network or by remote access. Of course, while disk storage devices 1229, 1231, and 1233 are illustrated as separate devices, a single disk storage device may be used to store any and all of the program instructions, measurement data, and results as desired.

In one implementation, seismic data from the receivers may be stored in disk storage device 1231. The system computer 1230 may retrieve the appropriate data from the disk storage device 1231 to process seismic data according to program instructions that correspond to implementations of various technologies described herein. Seismic data may include pressure and particle velocity data. The program instructions may be written in a computer programming language, such as C++, Java and the like. The program instructions may be stored in a computer-readable memory, such as program disk storage device 1233. Such computer-readable media may include computer storage media and communication media.

Computer storage media may include volatile and nonvolatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1100.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 1230 may present output primarily onto graphics display 1227. The system computer 1230 may store the results of the methods described above on disk storage 1229, for later use and further analysis. The keyboard 1226 and the pointing device (e.g., a mouse, trackball, or the like) 1225 may be provided with the system computer 1230 to enable interactive operation.

The system computer 1230 may be located at a data center remote from the survey region. The system computer 1230 may be in communication with the receivers (either directly or via a recording unit, not shown), to receive signals indicative of the reflected seismic energy. After conventional formatting and other initial processing, these signals may be stored by the system computer 1230 as digital data in the disk storage 1231 for subsequent retrieval and processing in the manner described above. While FIG. 12 illustrates the disk storage 1231 as directly connected to the system computer 1230, it is also contemplated that the disk storage device 1231 may be accessible through a local area network or by remote access. Furthermore, while disk storage devices 1229,1231 are illustrated as separate devices for storing input seismic data and analysis results, the disk storage devices 1229, 1231 may be implemented within a single disk drive (either together with or separately from program disk storage device 1233), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
    plotting on a graph one or more actual times at which one or more seismograms are received by a seismic receiver during a seismic survey;
    plotting a travel-time curve on the graph, wherein the travel-time curve represents one or more approximate times at which the seismograms are received by the seismic receiver;
    determining a residual static shift for at least one seismogram, wherein the residual static shift represents a difference between an actual time at which the at least one seismogram is received by the seismic receiver and a time on the travel-time curve that corresponds to the actual time; and
    using the residual static shift to estimate a time shift correction to correct a timing error in the time indicated by the travel-time curve.

2. The method of claim 1, wherein determining the residual static shift comprises:
    creating a first mathematical vector having a ray parameter variable and one or more residual static shift variables;
    determining one or more differential offsets based on spatial differences between one or more seismic sources, one or more seismic receivers, and a center of the seismic receivers;
    building a matrix having the differential offsets and one or more Kronecker deltas;
    creating a second mathematical vector having a residual static shift estimate for each seismic source location;
    setting a product of the first mathematical vector and the matrix as equal to the second mathematical vector; and
    solving for the first mathematical vector.

3. The method of claim 2, wherein the center of the seismic receivers is located at a center of gravity of the seismic receivers.

4. The method of claim 2, wherein the center of the seismic receivers is located at one of the seismic receivers closest to a center of gravity of the seismic receivers.

5. The method of claim 2, wherein determining the differential offsets comprises:
    determining a first spatial vector representing a direction and a distance between a location of a first seismic source and the center in the seismic survey area;
    determining a second spatial vector representing a direction and a distance between the location of the first seismic source and a location of a first seismic receiver in the seismic survey area; and
    determining a difference between the first spatial vector and the second spatial vector.

6. The method of claim 2, wherein creating the second mathematical vector comprises:
    performing a linear moveout (LMO) correction on the seismograms;
    stacking the LMO corrected seismograms;
    cross correlating each LMO corrected seismogram with the stacked LMO corrected seismograms to determine the residual static shift estimate; and
    determining a peak amplitude from each cross correlation to be the residual static shift estimate.

7. The method of claim 6, wherein the ray parameter variable is estimated using a plane wave destruction filter technique.

8. The method of claim 7, wherein the LMO correction is performed using the ray parameter that has been estimated using the plane wave destruction filter technique.

9. The method of claim 6, further comprising determining the residual static shift estimate as the residual static shift for each seismic source.

10. The method of claim 9, further comprising applying the residual static shift to the stacked LMO corrected seismograms.

11. A computer system, comprising:
    a processor; and
    a memory comprising program instructions executable by the processor to:
    plot a travel-time curve on a graph, wherein the travel-time curve represents an approximate time at which one or more seismograms are received by at least one seismic receiver in a seismic survey area;
    plot on the graph one or more actual times at which the seismograms are received by the at least one seismic receiver;
    perform a linear moveout (LMO) correction on the seismograms;
    stack the LMO corrected seismograms;
    cross correlate each LMO corrected seismogram with the stacked LMO
    corrected seismograms to determine a residual static shift;
    determine a peak amplitude from each cross correlation to be the residual static shift; and
    use the residual static shift to estimate a time shift correction to correct a timing error in the time indicated by the travel-time curve.

12. The computer system of claim 11, wherein the program instructions executable by the processor to perform the LMO correction comprise program instructions executable by the processor to:
    estimate a ray parameter using a plane wave destruction filter technique; and
    use the estimated ray parameter for the LMO correction.

13. The computer system of claim 11, wherein the program instructions executable by the processor further comprise program instructions executable by the processor to apply the residual static shift to the stacked LMO corrected seismograms.

14. The computer system of claim 11, wherein the center of the seismic receivers is located at a center of gravity of the seismic receivers.

15. A non-transitory computer-readable storage medium having stored thereon computer-executable instructions which, when executed by a computer, cause the computer to:
  plot a travel-time curve on a graph, wherein the travel-time curve represents an approximate time at which one or more seismograms are received by at least one seismic receiver in a seismic survey area;
  plot on the graph one or more actual times at which the seismograms are received by the at least one seismic receiver;
  create a first mathematical vector having a ray parameter variable and one or more residual static shift variables, wherein the residual static shift variables represent a difference between an actual time in which the at least one seismic receiver received a seismogram and a time on the travel-time curve that corresponds to the actual time;
  build a matrix having one or more differential offsets and one or more Kronecker deltas, wherein the differential offsets are based on spatial differences between one or more one or more seismic sources, one or more seismic receivers, and a center of the seismic receivers;
  create a second mathematical vector having a residual static shift estimate for each seismic source location;
  set a product of the first mathematical vector and the matrix as equal to the second mathematical vector;
  solve for the residual static shift variables in the first mathematical vector; and
  use the solved residual static shift variables to estimate a time shift correction to correct one or more timing errors in the time indicated by the travel-time curve.

16. The non-transitory computer-readable storage medium of claim 15, wherein the computer-executable instructions which, when executed by the computer, cause the computer to build the matrix comprises computer-executable instructions which, when executed by the computer, cause the computer to:
  determine a first spatial vector representing a direction and a distance between a location of a first seismic source and the center of the seismic receivers;
  determine a second spatial vector representing a direction and a distance between the location of the first seismic source and a location of a first seismic receiver in the seismic survey area;
  determine a difference between the first spatial vector and the second spatial vector; and
  store the difference in the matrix.

17. The non-transitory computer-readable storage medium of claim 15, wherein the computer-executable instructions which, when executed by the computer, cause the computer to create the second mathematical vector comprises computer-executable instructions which, when executed by the computer, cause the computer to:
  perform a linear moveout (LMO) correction on the seismograms;
  stack the LMO corrected seismograms;
  cross correlate at least one LMO corrected seismogram with the stacked LMO corrected seismograms to determine the residual static shift estimate; and
  determine a peak amplitude from each cross correlation to be the residual static shift estimate.

18. The non-transitory computer-readable storage medium of claim 17, wherein the ray parameter variable is estimated using a plane wave destruction filter technique.

19. The non-transitory computer-readable storage medium of claim 18, wherein the LMO correction is performed using the ray parameter that has been estimated using the plane wave destruction filter technique.

20. The non-transitory computer-readable storage medium of claim 17, wherein the computer-executable instructions which, when executed by the computer, further comprises computer-executable instructions which, when executed by the computer, cause the computer to determine the residual static shift estimate as the residual static shift for at least one seismic source.

21. The method of claim 1, wherein the travel-time curve represents a best fit curve for the actual times.

* * * * *